US007663814B2

(12) United States Patent
Kitahara

(10) Patent No.: US 7,663,814 B2
(45) Date of Patent: Feb. 16, 2010

(54) IMAGING LENS SYSTEM AND IMAGING APPARATUS

(75) Inventor: Yu Kitahara, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 12/334,305

(22) Filed: Dec. 12, 2008

(65) Prior Publication Data

US 2009/0161236 A1 Jun. 25, 2009

(30) Foreign Application Priority Data

Dec. 20, 2007 (JP) ........................... P2007-328236
Dec. 20, 2007 (JP) ........................... P2007-328237

(51) Int. Cl.
*G02B 9/60* (2006.01)

(52) U.S. Cl. ....................................... 359/770; 359/761

(58) Field of Classification Search ................. 359/754, 359/755, 761, 770

See application file for complete search history.

(56) References Cited

U.S. PATENT DOCUMENTS 3,642,351 A * 2/1972 Tronnier et al. ............. 359/757
5,087,987 A 2/1992 Simbal
5,508,846 A 4/1996 Hall
5,617,255 A 4/1997 Yamada
6,061,187 A * 5/2000 Kang ......................... 359/689
2005/0195501 A1 9/2005 Sato
2009/0052064 A1 2/2009 Caldwell

FOREIGN PATENT DOCUMENTS

EP 0 823 651 A1 2/1998
EP 1 452 899 A1 9/2004
EP 1 645 900 A1 4/2006
JP 5-224119 A 9/1993
JP 11-271610 A 10/1999

* cited by examiner

*Primary Examiner*—Scott J Sugarman
(74) *Attorney, Agent, or Firm*—Birch, Stewart, Kolasch & Birch, LLP

(57) ABSTRACT

The imaging lens system includes a negative first lens disposed on a most object side, having a concave surface directed toward the object side and having a meniscus shape, a cemented lens LC disposed on a most image side and having a convex surface on its most object side, and an aperture diaphragm disposed just in front of the object side of the cemented lens. The system satisfies the following conditional expressions:

$$0.05<(R2-R1)/(R1+R2)<0.25$$

$$\nu d1-\nu d2>15$$

where

R1 and R2 denote radius of curvatures of object side and image side surfaces of the first lens, respectively, and νd1 and νd2 denote Abbe numbers of lenses, which are located on the most object side and on the most image side among lenses constituting the cemented lens, at the d-line, respectively.

16 Claims, 17 Drawing Sheets

1
L1 L2 L3 L4 LC L5 L6
2 4 Z 3 2 4 St 5 Pim R1 R2

Example 1

Example 2

Example 3

Example 4

Example 5

Example 6

Example 1

Example 2

Example 3

Example 4

Example 5

Example 6

IMAGING LENS SYSTEM AND IMAGING APPARATUS

CROSS-REFERENCE TO RELATED APPLICATIONS

This application is based upon and claims the benefit of priority from the Japanese Patent Application Nos. 2007-328236 and 2007-328237 both filed on Dec. 20, 2007; the entire contents of which are incorporated herein by reference.

BACKGROUND OF THE INVENTION

1. Technical Field

The invention relates to an imaging lens system and an imaging apparatus, more particularly, to an imaging lens system suitable for use in a surveillance camera, a cell phone camera, an on-board camera, and the like employing an imaging device such as a CCD (Charge Coupled Device) and a CMOS (Complementary Metal Oxide Semiconductor), and an imaging apparatus having the imaging lens system.

2. Description of the Related Art

Recently, imaging devices such as CCD and CMOS have been downsized, and the number of pixels of the imaging device has been increased. In addition, an imaging apparatus main body having the imaging device has also been downsized, and thus it is also required to make an imaging lens system mounted therein be light and small.

Meanwhile, in an on-board camera, a surveillance camera, and the like, there is required a low-cost and high-performance lens that has high antiweatherability in the range of from outside air in a cold region to a vehicle compartment in summer of a tropical region and can be used in the wide temperature range.

JP Hei.11-271610 A describes a medium telephoto lens system that includes, in order from the object side, a positive first lens having a meniscus shape and having a convex surface directed toward the object side, a positive second lens, a negative third lens, an aperture diaphragm, and a cemented lens including a negative fourth lens and a positive fifth lens. Furthermore, JP Hei.5-224119 A describes a medium telephoto lens system that includes in order from the object side, a first lens group having three positive lenses having a meniscus shape and having a convex surface directed toward the object side, a second lens group having a negative lens formed in a meniscus shape, an aperture diaphragm, a third lens group having a cemented lens including a negative lens and a positive lens, and a fourth lens group having one or more positive lenses.

On-board cameras and surveillance cameras are used day and night, and particularly the on-board cameras take photographs using visible light in the daytime and take photographs using near-infrared light in the nighttime. Thus, these cameras need an optical system available in a wide wavelength range from the visible region to the near-infrared region. Furthermore, to photograph in low illumination intensity, these cameras also need a fast optical system having a large aperture ratio. In addition, considering that a cover glass, a filter, and the like are arranged between a lens system and an imaging device, an optical system having a long back focal length is preferred.

However, in the medium telephoto lens systems described in JP Hei.11-271610 A and JP Hei.5-224119 A, aberration correction in the visible region is considered, but performance of the lenses in the near-infrared region is not guaranteed. Furthermore, since the lens described in JP Hei.11-271610 A is formed as a slow optical system having an F number of about 4, the lens is inappropriate to use in the nighttime. Since the lens system described in JP Hei.5-224119 A has a large number of lenses, for example, seven or eight lenses, the lens system becomes a large optical system and becomes a high cost system. Moreover, since the lens system uses an aspheric surface lens, required precision at the time of cutting and assembly becomes higher, and thus the cost of the lens system becomes higher.

SUMMARY OF THE INVENTION

The invention has been made in consideration of the situation mentioned above, and provides a small-sized and low-cost imaging lens system having a long back focal length and a small F number while maintaining favorable optical performance in a wide wavelength range from the visible region to the near-infrared region. In addition, the invention provides an imaging apparatus having the imaging lens system.

According to a first aspect of the invention, an imaging lens system includes a negative first lens, a cemented lens and a stop. The negative first lens is disposed on a most object side, has a concave surface directed toward the object side and has a meniscus shape. The cemented lens is disposed on a most image side. A most object side surface of the cemented lens is a convex surface. The stop is disposed just in front of the object side of the cemented lens. The following conditional expressions are satisfied.

$$0.05<(R2-R1)/(R1+R2)<0.25 \quad (1)$$

$$vd1-vd2>15 \quad (2)$$

where R1 denotes a radius of curvature of an object side surface of the first lens,

- R2 denotes a radius of curvature of an image side surface of the first lens,
- vd1 denotes an Abbe number of a lens, which is located on the most object side among lenses constituting the cemented lens, at the d-line, and
- vd2 denotes an Abbe number of a lens, which is located on the most image side among the lenses constituting the cemented lens, at the d-line.

Here, "just in front of" in the sentence "a stop is disposed just in front of the object side of the cemented lens" does not means a distance relation, but means that another optical element is not disposed between the cemented lens and the stop.

Furthermore, when the first lens is an aspheric surface lens, paraxial radiuses of curvature are used as the R1 and R2 in the conditional expression (1).

In the imaging lens system, the negative first lens is disposed on the most object side, has the concave surface directed toward the object side and has the meniscus shape. Thereby, it is possible to easily achieve an optical system having a small F number and a long back focal length. In addition, the negative power of the first lens is defined by the conditional expression (1), and thus it is possible to easily achieve a long back focal length and favorable correction of various aberrations. Furthermore, in the imaging lens system according to the first aspect of the invention, the cemented lens is disposed on the most image side, and dispersive characteristics of the cemented lens material are determined so as to meet the conditional expression (2). Thus, it is possible to easily achieve both of (i) suppression in comatic aberration and astigmatism and (ii) favorable correction for lateral chromatic aberration in a wide wavelength range. Moreover, by employing the configurations mentioned above, it is possible to achieve a small-sized and high-performance optical system even when an aspheric surface lens is not used.

In the imaging lens system, it is preferable that all the lenses constituting the cemented disposed on the most image side are positive lenses.

According to a second aspect of the invention, an imaging lens system includes, in order from an object side, a negative first lens, a positive second lens, a positive third lens, a negative fourth lens, a stop and a cemented lens. The negative first lens has a concave shape directed toward the object side and has a meniscus shape. The positive second lens has a convex surface directed toward the object side. The positive third lens has a meniscus shape with a convex shape directed toward the object side. The negative fourth lens has a meniscus shape with a convex surface directed toward the object side. The cemented lens includes a positive fifth lens and a positive sixth lens. The cemented lens has a convex surface directed toward the object side.

In this imaging lens system, the negative first lens is disposed on the most object side, has the concave shape directed toward the object side and has the meniscus shape. Thereby, it is possible to easily achieve a fast optical system having a small F number and a long back focal length. Furthermore, in the imaging lens system according to the second aspect of the invention, the cemented lens is disposed on the most image side, and configurations such as a shape and a power of each of the first to sixth lenses are appropriately set as described above. Thus, it is possible to easily achieve both of (i) suppression in comatic aberration and astigmatism and (ii) favorable correction for lateral chromatic aberration in a wide wavelength range. Accordingly, it is possible to achieve a small-sized and high-performance optical system even when an aspheric surface lens is not used.

In the imaging lens system according to the first and second aspects of the invention, it is preferable that the following conditional expression be satisfied:

$$0.10<(R2-R1)/(R1+R2)<0.20 \qquad (1\text{-}1),$$

where R1 denotes a radius of curvature of the object side surface of the first lens, and R2 denotes a radius of curvature of the image side surface of the first lens.

Furthermore, in the imaging lens systems according to the first and second aspects of the invention, it is preferable that an absolute value of a radius of curvature of each surface of the cemented lens is larger as approaching the image side from the object side.

Moreover, in the imaging lens systems according to the first and second aspects of the invention, it is preferable that refractive indexes of all the lenses of the whole system at the d-line be larger than 1.75. In addition, it is more preferable that refractive indexes of all the lenses of the whole system at the d-line be larger than 1.8.

Furthermore, in the imaging lens systems according to the first and second aspects of the invention, it is preferable that the following conditional expression be satisfied:

$$\nu d1-\nu d2>20 \qquad (2\text{-}1)$$

where vd1 denotes an Abbe number of a lens, which is located on the most object side among lenses constituting the cemented lens, at the d-line, and vd2 denotes an Abbe number of a lens, which is located on the most image side among the lenses constituting the cemented lens, at the d-line.

Further, respective values of the conditional expressions are obtained when the e-line (wavelength 546.07 nm) is used as a reference wavelength. In this specification, the e-line is assumed as a reference wavelength if there is no specific designation.

According to a third aspect of the invention, an imaging apparatus includes the imaging lens system described above and an imaging device that converts an optical image formed by the imaging lens system into an electric signal.

According to the first to third aspects of the invention, the configurations such as a shape and a power of each of the lenses are appropriately set. Thus, it is possible to provide a small-sized and low-cost imaging lens system having a long back focal length and a small F number while maintaining favorable optical performance in a wide wavelength range from the visible region to the near-infrared region. In addition, it is also possible to provide an imaging apparatus having the imaging lens system.

In such on-board lenses, sometimes a ghost image may be formed due to reflection of light such as headlight of the opposite side vehicle onto a lens surface at the time of using an on-board lens. Sometimes the formed ghost image may reduce recognizability with respect to an image taken by a camera depending on its level. Since a reflectivity of the imaging device surface among reflective surfaces causing ghost images is larger than reflectivities of the respective lens surfaces, an intensity of a ghost image formed by reflection between the imaging device surface and the lens surface becomes stronger than that of a ghost image formed by reflection between the lens surfaces. Accordingly, it is particularly required to reduce the intensity of the ghost image formed by the reflection between the imaging device surface and the lens surface.

However, there have been rarely developed lenses provided with a solution of ghost image based on the consideration mentioned above. JP Hei.11-271610 A and JP Hei.5-224119 A don't mention about the solution of ghost image.

In consideration of the situation mentioned above, the invention may provide an imaging lens system capable of suppressing occurrence of a ghost image having a strong intensity while maintaining favorable optical performance, and provide an imaging apparatus having the imaging lens system.

According to a fourth aspect of the invention, an imaging lens system includes a negative meniscus lens, a cemented lens and a stop. The negative meniscus lens is disposed on a most object side and has a concave surface directed toward the object side. The cemented lens is disposed on a most image side. A most object side surface of the cemented lens is a convex surface. The cemented lens is formed by cementing positive lenses. The stop is disposed just in front of the object side of the cemented lens. An incident angle of an axial marginal ray to the most object side surface of the cemented lens is 8° or more. An exit angle of the axial marginal ray from the most image side surface of the cemented lens is 8° or more.

In the imaging lens system, in air-exposed surfaces of all the lenses of the whole system, it is preferable that respective incident angles of the axial marginal rays from air to the surfaces are 6° or more and that exit angles of the axial marginal rays from the surfaces to air is 6° or more.

According to a fifth aspects of the invention, an imaging apparatus includes the imaging lens system described above, and an imaging device converting an optical image formed by the imaging lens system into an electric signal.

Here, "just in front of" in the sentence "a stop is disposed just in front of the object side of the cemented lens" does not means a distance relation, but means that another optical element is not disposed between the cemented lens and the stop.

Here, "axial marginal ray" is defined as a ray that exits from an on-axis object point and passes an end of an entrance pupil of an optical system.

Further, "an incident angle of an axial marginal ray to the most object side surface of the cemented lens" is defined as an angle between the axial marginal ray and the normal line of the most object side surface at an incident position of the axial marginal ray to the most object side surface. It is also similarly applied to "each incident angle of the axial marginal rays from air to the surfaces". Further, "an exit angle of the axial marginal ray from the most image side surface of the cemented lens" is defined as an angle between the axial marginal ray and the normal line of the most image side surface at an exit position of the axial marginal ray from the most image side surface. It is also similarly applied to "exit angle of the axial marginal rays from the surfaces to air".

In the imaging lens system according to the fourth aspects of the invention, an angle between the incident axial marginal ray and the normal line of the surface and an angle between the exit axial marginal ray and the normal line of the surface are defined to be a predetermined angle or more. With this configuration, when the rays are reflected from the respective surfaces, the reflected rays tend to be widely dispersed. Then, when the reflected rays reach an image plane, an optical intensity tends to decrease. As a result, it is possible to suppress occurrence of a ghost image having a strong intensity.

According to the imaging lens system based on the fourth aspects of the invention, the incident angle and exit angle of the axial marginal ray are set to be a predetermined angle or more. Thus, the rays that are incident on the image plane again by multiple reflections tend to disperse in a broad range. Accordingly, it is possible to suppress occurrence of a ghost image having a strong intensity. Furthermore, according to the fifth aspect of the invention, the imaging apparatus has the imaging lens system according to any one of the aspects of the invention. Thus, it is possible to suppress occurrence of a ghost image having a strong intensity on a screen. Accordingly, it is possible to obtain a clearer image as compared with an imaging apparatus to which a solution of ghost image is not provided.

DETAILED DESCRIPTION OF EMBODIMENTS OF THE INVENTION

Hereinafter, embodiments of the invention will be described in detail with reference to the drawings. First, an imaging lens system according to an embodiment of the invention will be described, and then an imaging apparatus according to the embodiment of the invention will be described.

Figure 1:
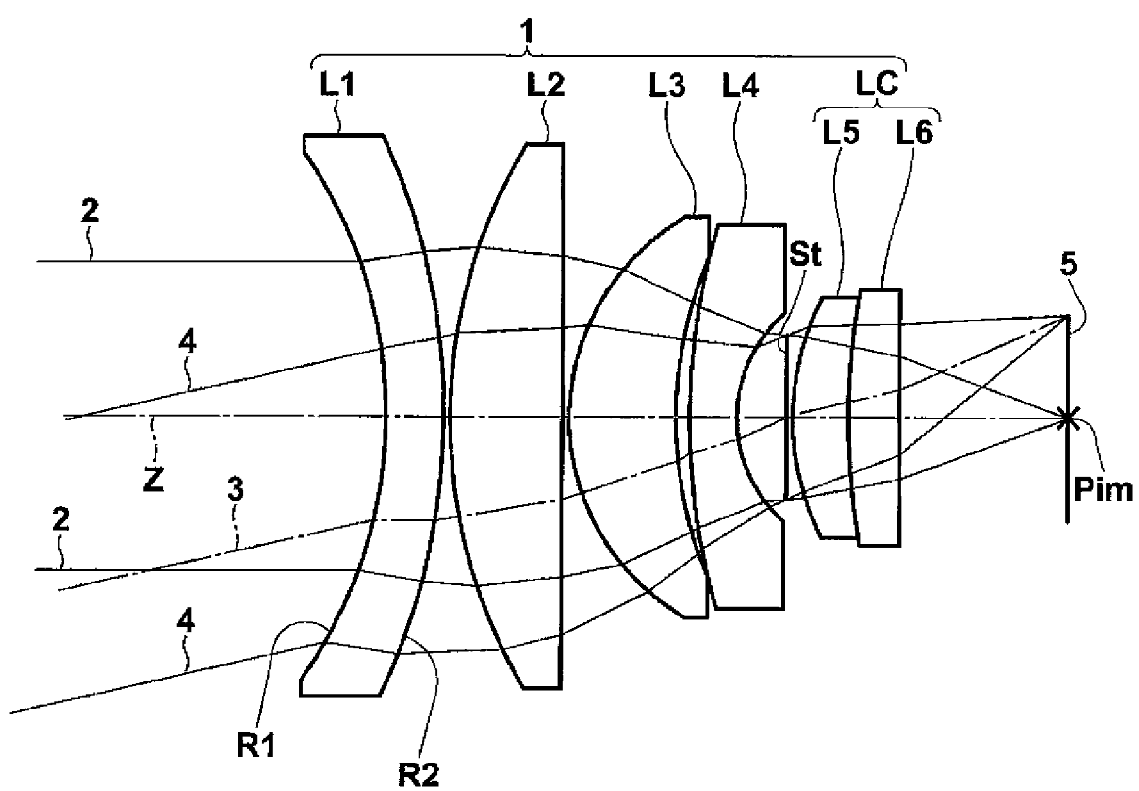
FIG. 1 is an optical path diagram showing an imaging lens system according to an embodiment of the invention.

FIG. 1 shows a lens section view of an imaging lens system 1 according to the embodiment of the invention. FIG. 1 also shows an axial marginal ray 2 (outermost peripheral ray of on-axis rays), a principal ray 3 of off-axis rays, and an outermost peripheral ray 4 of the off-axis rays. In addition, the configuration example shown in FIG. 1 corresponds to the lens configuration according to Example 1 (which will be described later in FIG. 8). Also, FIGS. 9 to 13 show lens section views of the other configuration examples of the imaging lens system according to the embodiment of the invention, and those correspond to the lens configurations according to Examples 2 to 6 (which will be described later). In the imaging lens system of Examples 1 to 6, the basic lens configuration is the same, and thus hereinafter the imaging lens system 1 having the configuration shown in FIG. 1 will be described as an example of the imaging lens system according to the embodiment of the invention.

The imaging lens system 1 includes, in order from the object side, a negative first lens L1 having a concave surface directed toward the object side and having a meniscus shape, a positive second lens L2 having a convex surface directed toward the object side, a positive third lens L3 having a meniscus shape with a convex surface directed toward the object side, a negative fourth lens L4 having a meniscus shape with a convex surface directed toward the object side, an aperture diaphragm St, and a cemented lens LC including a positive fifth lens L5 and a positive sixth lens L6 and having a convex surface directed toward the object side.

Also, the aperture diaphragm St shown in FIG. 1 does not illustrate its shape and its size, but illustrates its position on an optical axis Z. Also, in FIG. 1, there is illustrated an imaging device 5 disposed on an image plane including an image formation position Pim of the imaging lens system 1, in consideration of the case where the imaging lens system 1 is applied to an imaging apparatus. The imaging device 5 is one for converting an optical image formed by the imaging lens system 1 into an electric signal, and includes, for example, a CCD image sensor or the like.

Although not shown in FIG. 1, when the imaging lens system 1 is applied to the imaging device 5, it is preferable that a cover glass and various filters such as a low pass filter, an infrared-cut filter, and/or a ultraviolet cut filter be disposed between the imaging lens system 1 and the imaging device 5 in accordance with the configuration of a camera on which the lens system is mounted. For example, when the imaging lens system is used in an on-board camera as a night vision camera for eyesight at nighttime, it is preferable that a filter for cutting blue light from ultraviolet light may be disposed between the lens system and the imaging device. The imaging lens system 1 is formed as an optical system having a long back focal length so that the cover glass and the filters are arranged with enough space and are adjustable at the time of installation.

The imaging lens system 1 is configured so that a ghost image having a strong intensity rarely occurs. Specifically, as shown in a partially enlarged diagram of FIG. 2, the imaging lens system 1 is configured so that an incident angle $\alpha i$ of the axial marginal ray 2 on the most object side surface of the cemented lens LC is 8° or more. The imaging lens system 1 is also configured so that an exit angle $\alpha e$ of the axial marginal ray 2 from the most image side surface of the cemented lens LC is 8° or more.

Furthermore, in order to suppress occurrence of the ghost image having a strong intensity, in air-exposed surfaces of all the lenses of the whole system, it is preferable that incident angles of the axial marginal rays 2 from air to the surfaces be 6° or more, and exit angles of the axial marginal rays 2 from the surfaces to air be 6° or more. The imaging lens system 1 is configured in this manner.

Figure 2:
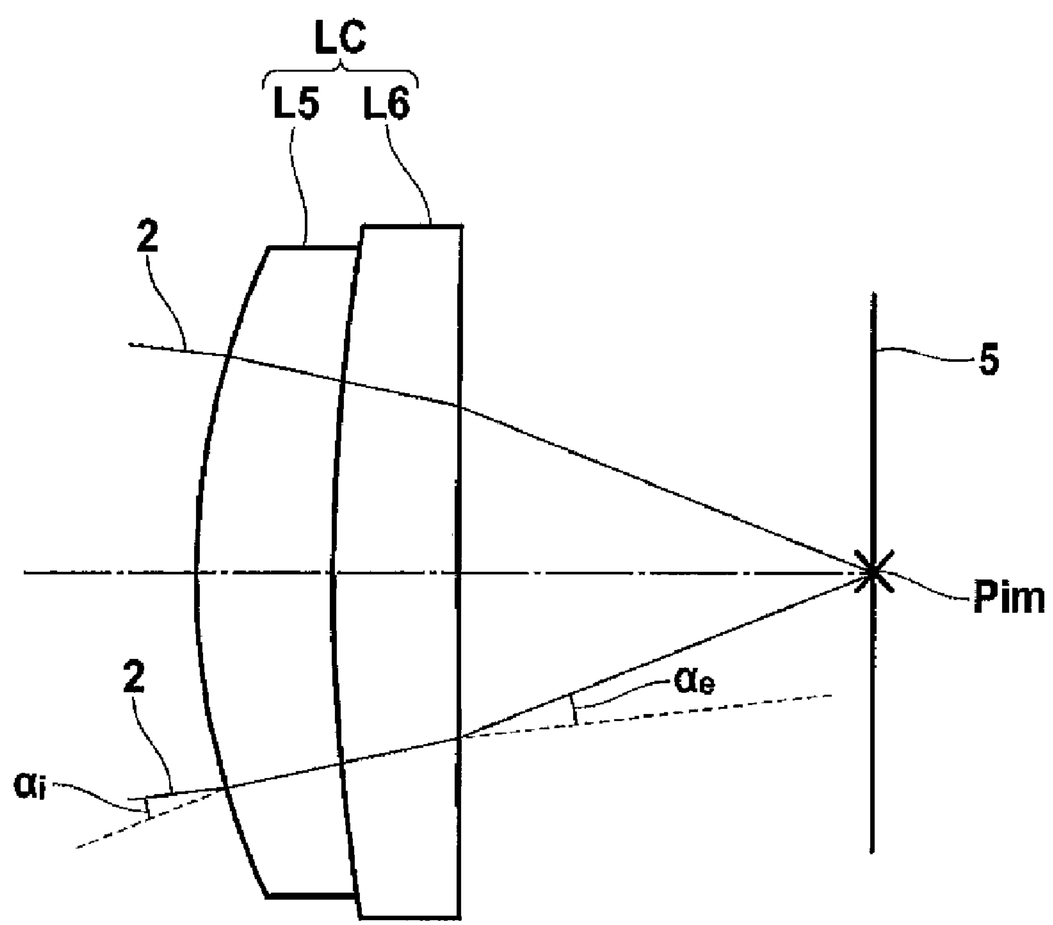
FIG. 2 is a diagram showing an incident angle and an exit angle of an axial marginal ray with respect to a cemented lens.

Here, the "incident angle" is an angle between a ray and a normal line of an incident surface at an incident point of the ray. The "exit angle" is an angle between a ray and a normal line of an exit surface at an exit point of the ray. In FIG. 2, the normal lines of surfaces at the incident point and the exit point are illustrated by dotted lines, respectively.

When a ray reflected by a lens surface, the imaging device 5 or the like is incident onto the imaging device 5, such a ray forms a ghost image. When a ray is incident on each lens surface and an angle (an incident angle) formed between the ray and the normal line of the surface at the incident point is small, an angle formed between the incident ray and the ray reflected by the lens surface becomes small. Hence, the reflected ray is condensed again in an effective range (an image formation area) on the imaging device 5. Thus, there is a high possibility that a ghost image having a strong intensity occurs.

Also, in a case of using a general rotationally symmetric optical system, an exit angle of an axial marginal ray from a lens surface is equal to an incident angle which is formed when the axial marginal ray is reflected by the imaging device 5 and is incident on the same lens surface. Specifically, when the lower side axial marginal ray 2 shown in FIG. 2 is reflected by the imaging device 5 and is incident on the sixth lens L6, an incident angle of the ray (an angle (not shown in the drawing) formed between the normal line of the image side surface of the sixth lens L6 and the upper axial marginal ray 2) is equivalent to the exit angle $\alpha e$ shown in FIG. 2. As described above, when the incident angle is small, a ghost image having a strong intensity tends to be formed. Thus, in order to suppress a ghost image, it is preferable that each incident angle to surfaces, that is, each exit angle from surfaces be large.

Accordingly, it can be seen that both of the incident angle and the exit angle are preferably are equal to or greater than a predetermined angle. Also, a reflectivity on an air-exposed surface is higher than a reflectivity on a cemented surface. Thus, it is preferable to consider the incident angle on an air-exposed surface and the exit angle on an air-exposed surface.

Furthermore, a reflectivity on an imaging device 5 is higher than reflectivities on lens surfaces. Thus, a ghost image formed by a ray, which is reflected by the imaging device 5, is reflected by any one lens surface, and is incident on the imaging device 5 again, is stronger in intensity than a ghost image formed by reflection between lens surfaces. Accordingly, by considering the case of reflection by the imaging device 5, it is possible to efficiently suppress a ghost image having a strong intensity.

When the reflection by the imaging device 5 is considered, a principal ray is diagonally incident on the imaging device 5, and an on-axis ray condensed on the center of a screen has a higher possibility to form a ghost image on the screen than an off-axis ray deviated from the center of the screen. Accordingly, it is effective to define the incident angle and the exit angle of the axial marginal ray.

Further, a ray reflected by a lens closer to the object side than the aperture diaphragm St may be shielded by the aperture diaphragm St. In contrast, rays reflected by the imaging device 5 and a lens surface closer to the image side than the aperture diaphragm St are hardly shielded by the aperture diaphragm St. Thus, such rays tend to form ghost images. Accordingly, it is particularly effective to define the incident angle and the exit angle on the cemented lens, which is disposed closer to the image side than the aperture diaphragm St.

In the imaging lens system 1 according to this embodiment, the incident angle $\alpha i$ and the exit angle $\alpha e$ of the axial marginal ray is defined in consideration of the situation mentioned above. Thereby, it is possible to efficiently suppress a ghost image having a strong intensity. When the incident angle $\alpha i$ and the exit angle $\alpha e$ are set to be the above-mentioned angle or more, the reflected light is widely dispersed, and a light focusing density on the image plane tends to decrease. Thus, it is possible to easily suppress occurrence of a ghost image having a strong intensity.

Furthermore, since the cemented lens LC of the imaging lens system 1 is formed by cementing the positive lenses, the final surface can be configured to have a convex surface or a concave surface having a small curvature. Thereby, flare light reflected by the imaging device 5 and reflected by the final surface again is prevented from being condensed on the imaging device 5. Thus, it is possible to suppress a ghost image having a strong intensity. In contrast, when the most image side lens is formed of a negative lens, the most image side lens surface (hereinafter, may be referred to as the "final surface") of the whole system has a concave surface having a large curvature. Accordingly, flare light reflected by the imaging device 5 is reflected by the final surface again, and is condensed on the imaging device 5 again. Thus, there is a high possibility that a flare having a strong intensity, that is, a ghost image occurs.

Figure 3:
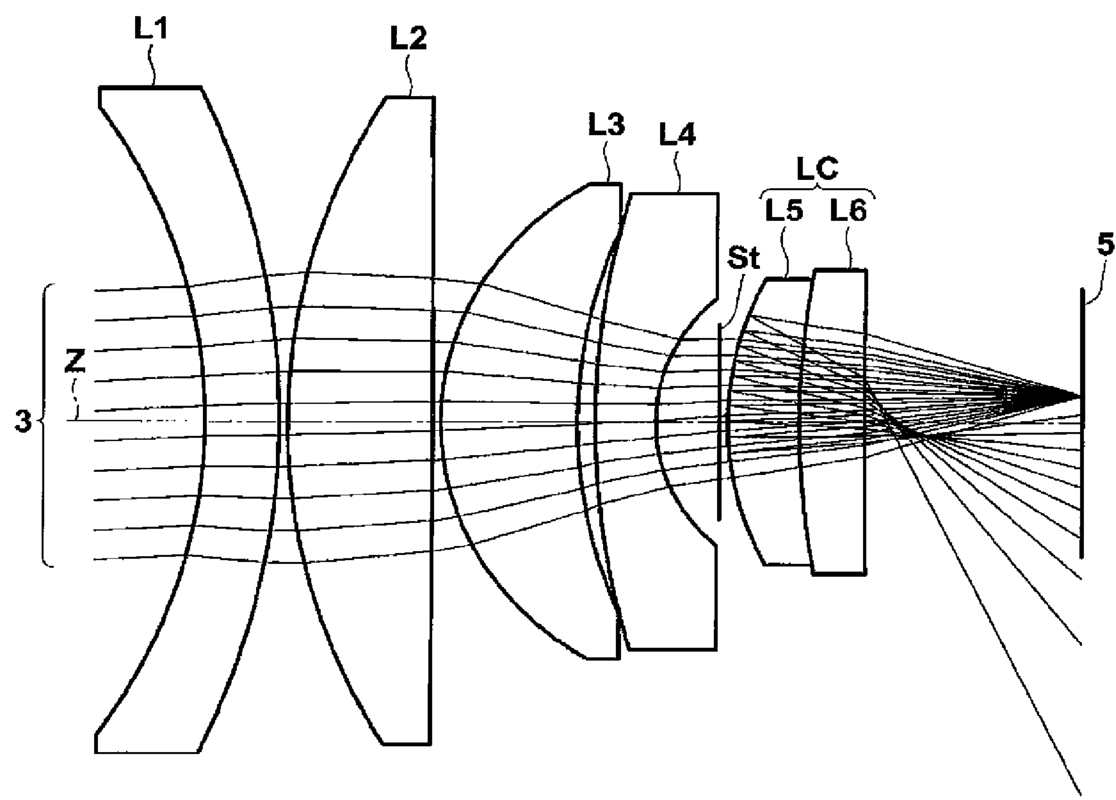
FIG. 3 is a ray-tracing diagram of multiple reflections in the imaging lens system shown in FIG. 1.
Figure 4:
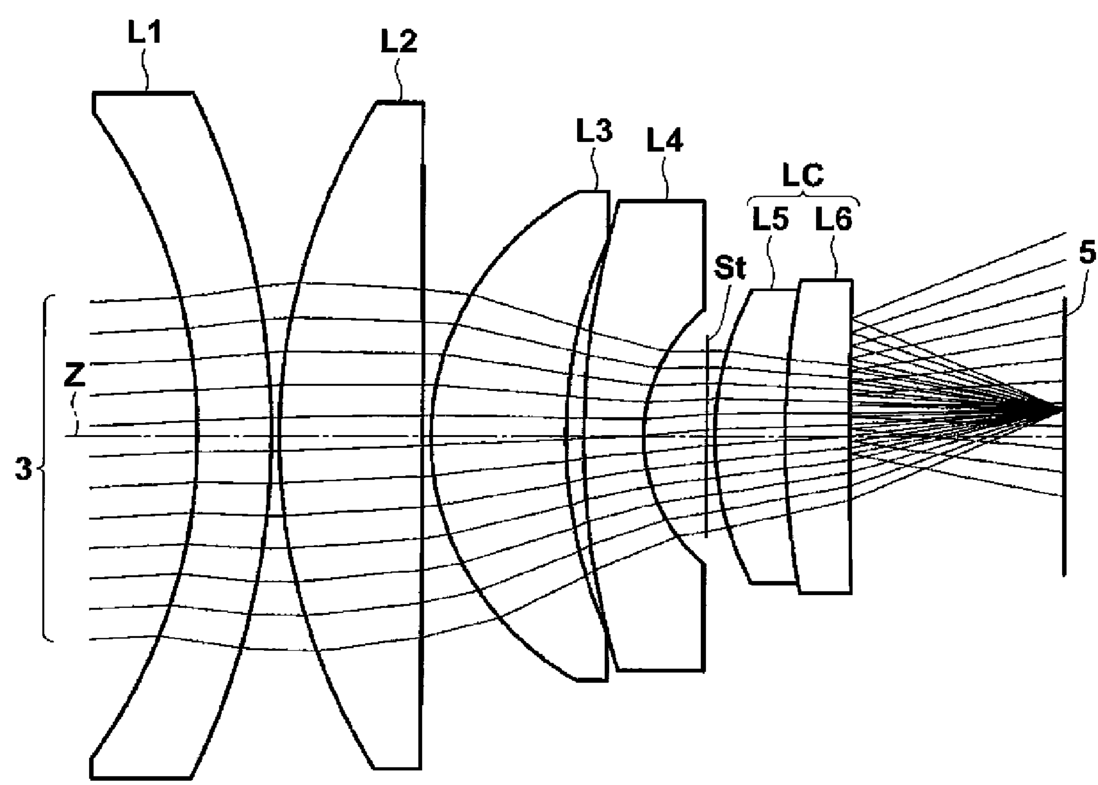
FIG. 4 is a ray-tracing diagram of multiple reflections in the imaging lens system shown in FIG. 1.
Figure 5:
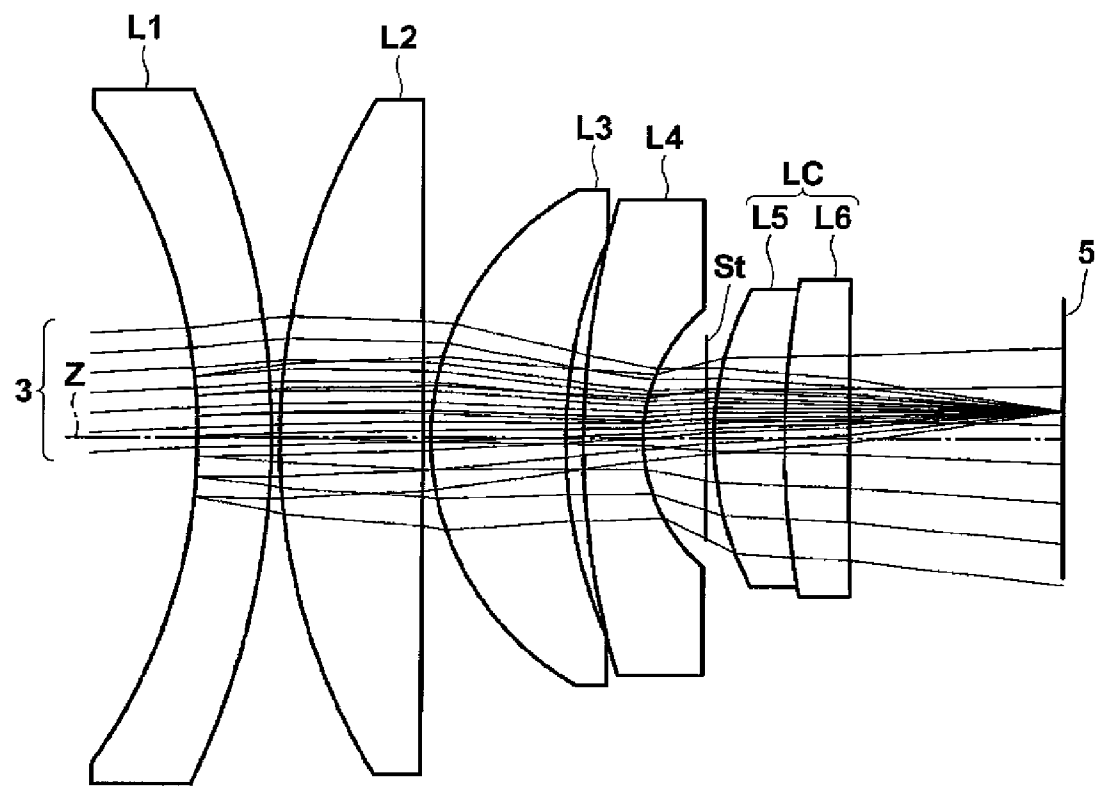
FIG. 5 is a ray-tracing diagram of multiple reflections in the imaging lens system shown in FIG. 1.
Figure 6:
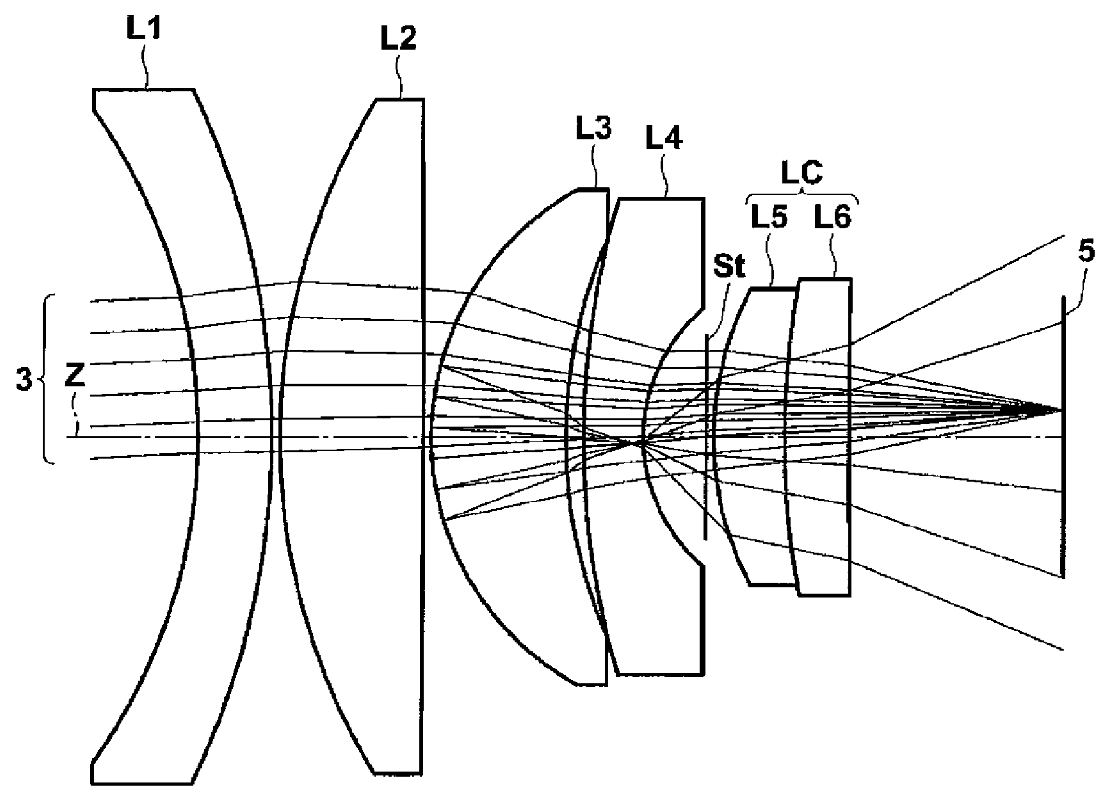
FIG. 6 is a ray-tracing diagram of multiple reflections in the imaging lens system shown in FIG. 1.
Figure 7:
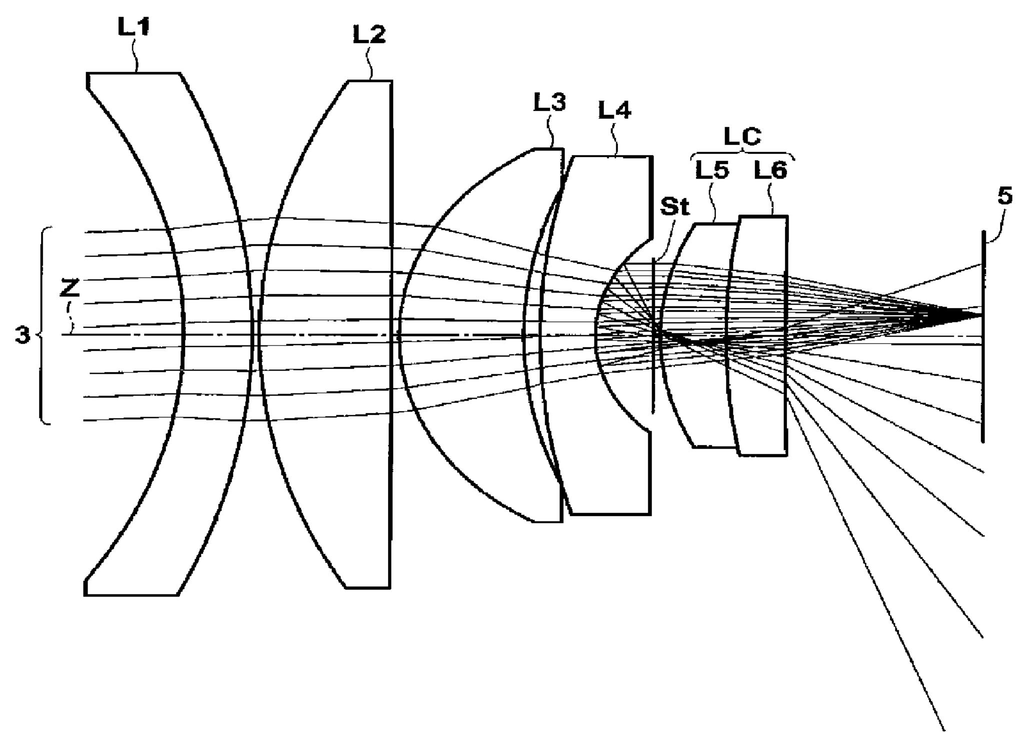
FIG. 7 is a ray-tracing diagram of multiple reflections in the imaging lens system shown in FIG. 1.

FIGS. 3 to 7 show results of ray tracing simulations of multiple reflections when parallel rays 3 are incident on the imaging lens system 1 with the assumption that the imaging device 5 and the lens surfaces serve as reflection surfaces. FIG. 3 shows reflection by the most object side surface of the cemented lens LC and by the surface of the imaging device 5. FIG. 4 shows reflection by the most image side surface of the cemented lens LC and by the surface of the imaging device 5. FIG. 5 shows reflection by the object side surface of the first lens L1 and by the surface of the imaging device 5. FIG. 6 shows reflection by the object side surface of the third lens L3 and by the surface of the imaging device 5. FIG. 7 shows reflection by the image side surface of the fourth lens L4 and by the surface of the imaging device 5. In FIGS. 3 to 7, for the convenience of explanation, the parallel rays 3 are illustrated as if the rays have a slight angle from the on-axis ray, and a diameter of the rays is also properly set.

In any case of FIGS. 3 to 7, the light, which is reflected by the lens surfaces and by the imaging device 5 and is incident on the imaging device 5, becomes divergent light, and thus the focusing density on the imaging device 5 is not so high. From these results, it can be seen that a ghost image having a strong intensity does not occur. That is, a strong ghost image is satisfactorily suppressed in the imaging lens system 1, in terms of reflection by the lens surface and by the imaging device 5 according to the examples shown in FIGS. 3 to 7.

In the imaging lens system 1, the first lens L1, which is disposed on the most object side, is the negative lens having the concave surface directed toward the object side and having the meniscus shape. Thereby, it becomes easy to secure a long back focal length and obtain a fast optical system having a small F number.

It is preferable that the imaging lens system 1 satisfies the following conditional expression (1):

$$0.05<(R2-R1)/(R1+R2)<0.25 \quad (1)$$

where R1 denotes a radius of curvature of the object side surface of the first lens L1, and R2 denotes a radius of curvature of the image side surface of the first lens L1, The conditional expression (1) defines an allowable range of a negative power of the first lens L1 disposed on the most object side. If (R2−R1)/(R1+R2) falls below the lower limit of the conditional expression (1), it becomes difficult to secure a long back focal length, to correct longitudinal chromatic aberration and to correct field curvature. If (R2−R1)/(R1+R2) exceeds the upper limit of the conditional expression (1), it becomes difficult to correct field curvature and to correct lateral chromatic aberration.

It is more preferable that the imaging lens system 1 further satisfies the following conditional expression (1-1):

$$0.10<(R2-R1)/(R1+R2)<0.20 \quad (1\text{-}1).$$

By further satisfying the conditional expression (1-1), it becomes easy to secure a long back focal length, to correct longitudinal chromatic aberration, to correct field curvature, and to correct lateral chromatic aberration.

In the imaging lens system 1, it is preferable that the cemented lens LC on the most image side satisfies the following conditional expression (2):

$$\nu d1-\nu d2>15 \quad (2),$$

where vd1 denotes an Abbe number of a lens, which is located on the most object side among lenses constituting the cemented lens LC, at the d-line, and vd2 denotes an Abbe number of a lens, which is located on the most image side among the lenses constituting the cemented lens LC, at the d-line.

The conditional expression (2) defines an allowable range of a dispersive characteristic of a material of the cemented lens disposed on the most image side. By satisfying the conditional expression (2), it becomes easy to satisfactorily correct lateral chromatic aberration while suppressing comatic aberration and astigmatism.

It is more preferable that the imaging lens system 1 further satisfies the following conditional expression (2-1):

$$\nu d1-\nu d2>20 \quad (2\text{-}1)$$

By further satisfying the conditional expression (2-1), it becomes easier to satisfactorily correct lateral chromatic aberration while suppressing comatic aberration and astigmatism.

It is preferable that an absolute value of a radius of curvature of each surface of the cemented lens LC is larger as approaching the image side from the object side. The imaging lens system 1 shown in FIG. 1 is configured in this manner. With such a configuration, it is possible to secure a long back focal length and satisfactorily maintain field curvature while achieving a good balance between longitudinal chromatic aberration and lateral chromatic aberration.

Furthermore, the object side surface of the fifth lens L5, that is, the most object side surface of the cemented lens LC is configured to be a convex surface directed toward the object side. With such a configuration, it is advantageous to correct aberrations.

The cemented surface of the cemented lens LC of the imaging lens system 1 shown in FIG. 1 has a curvature center on the image side. Also, in the imaging lens system according to Examples 2 to 6 which will be described later, the cemented surface has the curvature center on the image side (algebraic sign of a radius of curvature thereof is positive) or if having the curvature center on the object side (algebraic sign of a radius of curvature thereof is negative), has a small curvature. With such a configuration, an incident angle of the off-axis ray to the cemented surface increases, and thus it is possible to effectively correct lateral chromatic aberration.

Further, even if the curvature of the cemented surface of the cemented lens LC is not so large, an angle formed between the cemented surface and the outer peripheral ray of the on-axis rays is large in an optical system having a small F number like the imaging lens system 1. Thus, it is also possible to effectively correct longitudinal chromatic aberration.

In the imaging lens system 1, the cemented lens LC is formed by cementing the two positive lenses (the fifth lens L5 and the sixth lens L6). In the imaging lens system according to this embodiment of the invention, the cemented lens disposed on the most image side can be configured to be entirely formed of positive lenses. With this configuration, it becomes easy to correct chromatic aberration and field curvature while ensuring a long back focal length.

The configuration of the cemented lens LC formed of such positive lenses is preferable in view of prevention of a ghost image and reduction of a ghost image. When the lens on the most image side is formed of a negative lens, the lens surface (hereinafter, may be referred to as the "final surface") on the most image side of the whole system is a concave surface having a large curvature. Accordingly, flare light reflected by the imaging device 5 is reflected by the final surface again, and is condensed on the imaging device 5 again. Thus, there is a possibility that a flare having a strong intensity, that is, a ghost image occurs. Conversely, in the imaging device 1, the lens on the most image side is a positive lens, and thus the final surface is a convex surface or a concave surface having a small curvature. Thereby, it is possible to prevent flare light, which is reflected by the imaging device 5 and is reflected by the final surface again, from being condensed on the imaging device 5.

The first lens L1 to the sixth lens L6 constituting the imaging lens system 1 have the arrangement of negative, positive, positive, negative, positive and positive powers in order from the object side. Hence, the incident luminous flux is enlarged by the negative first lens L1 so that a long back focal length is ensured. Subsequently, the luminous flux gradually becomes convergent by the positive second and third lenses L2 and L3. Once balance between positive and negative aberrations are achieved by the negative fourth lens L4, and then, the luminous flux is converged to form an image by the positive fifth sixth lenses L5 and L6. Furthermore, the imaging lens system 1 uses many lenses each having a meniscus shape that causes less aberration than a biconvex shape and a biconcave shape. Thus, it is possible to reduce aberration of the whole system. In particular, it is possible to satisfactorily suppress comatic aberration and astigmatism and achieve high optical performance while securing a small F number.

Also, the third lens L3, the fourth lens L4, and the fifth lens L5 are arranged adjacent to each other, and have a meniscus shape having a convex surface directed toward the object side, a meniscus shape having a convex surface directed toward the object side, and a shape having a convex surface directed toward the object side, respectively. Thereby, it is possible to arrange these lenses with spaces therebetween being narrowed. Thus, it is also possible to achieve downsizing.

In the imaging lens system according to this embodiment, it is preferable that refractive indexes of all the lenses constituting the whole system at the d-line are larger than 1.75. Furthermore, it is more preferable that refractive indexes of all the lenses of the whole system at the d-line are larger than 1.8. In order to achieve downsizing, it is preferable that each lens has a large power. However, when a small radius of curvature is set for each surface to have a large power, it becomes difficult to correct all aberrations including chromatic aberration. In order to increase a power without decreasing a radius of curvature of each surface, a material having a high refractive index as described above may be employed. Thereby, it is possible to achieve downsizing while suppressing all aberrations.

Also, when the imaging lens system is used in severe environment such as on-board camera, it is preferable that a lens disposed on the most object side has high resistivity against temperature variance caused by direct rays and surface deterioration caused by rainstorm. In addition, it is preferable that the lens uses a material having high resistivity against chemicals such as oils and cleansers, that is, a material having high water resistance, high antiweatherability, high acid resistance, and high chemical resistance.

Also, as a material of the lens disposed on the most object side, it is preferable to use a material that is hard and is scarcely broken, and specifically, it is preferable to use glass or transparent ceramics. The ceramics has properties of higher stiffness than normal glass and high heat resistance.

Also, when the imaging lens system is applied to an on-board camera, it is required to be available in a wide temperature range from outside air in a cold region to a vehicle compartment in summer of a tropical region. When the imaging lens system is used in the wide temperature range, it is preferable to use a lens material having a small linear expansion coefficient. Also, in order to manufacture a low-cost lens, it is preferable that all lenses are formed of spherical lenses.

EXAMPLES

Figure 8:
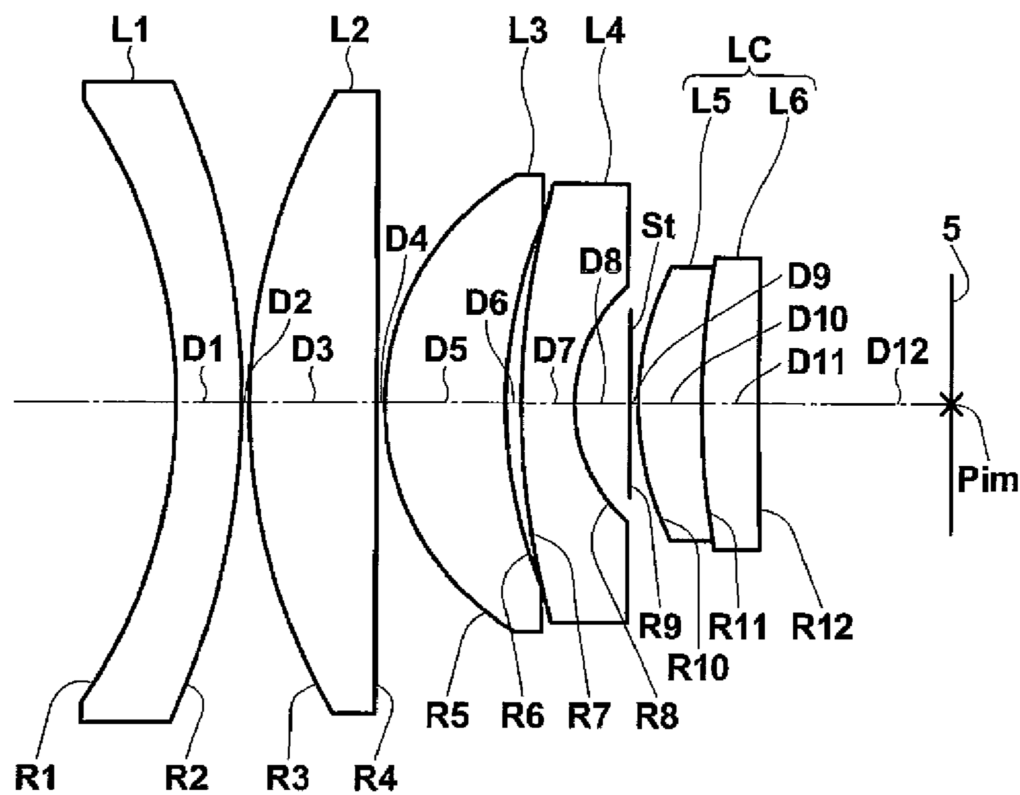
FIG. 8 is a section diagram showing the configuration of an imaging lens system according to Example 1 of the invention.
Figure 9:
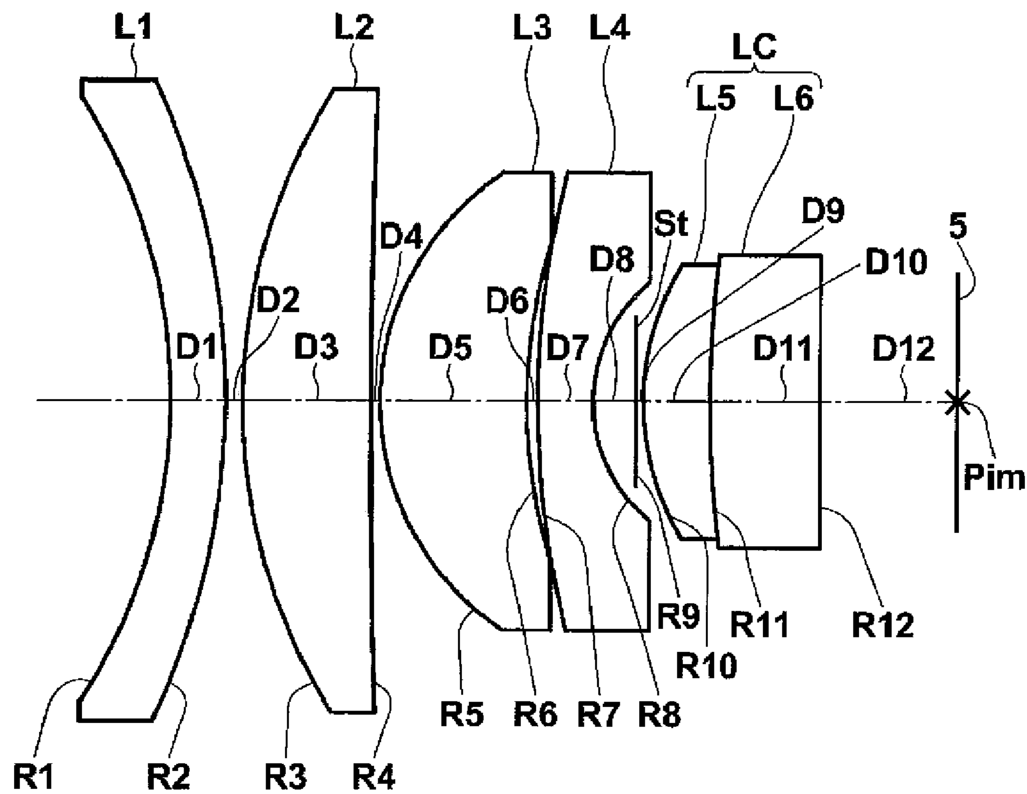
FIG. 9 is a section diagram showing the configuration of an imaging lens system according to Example 2 of the invention.
Figure 10:
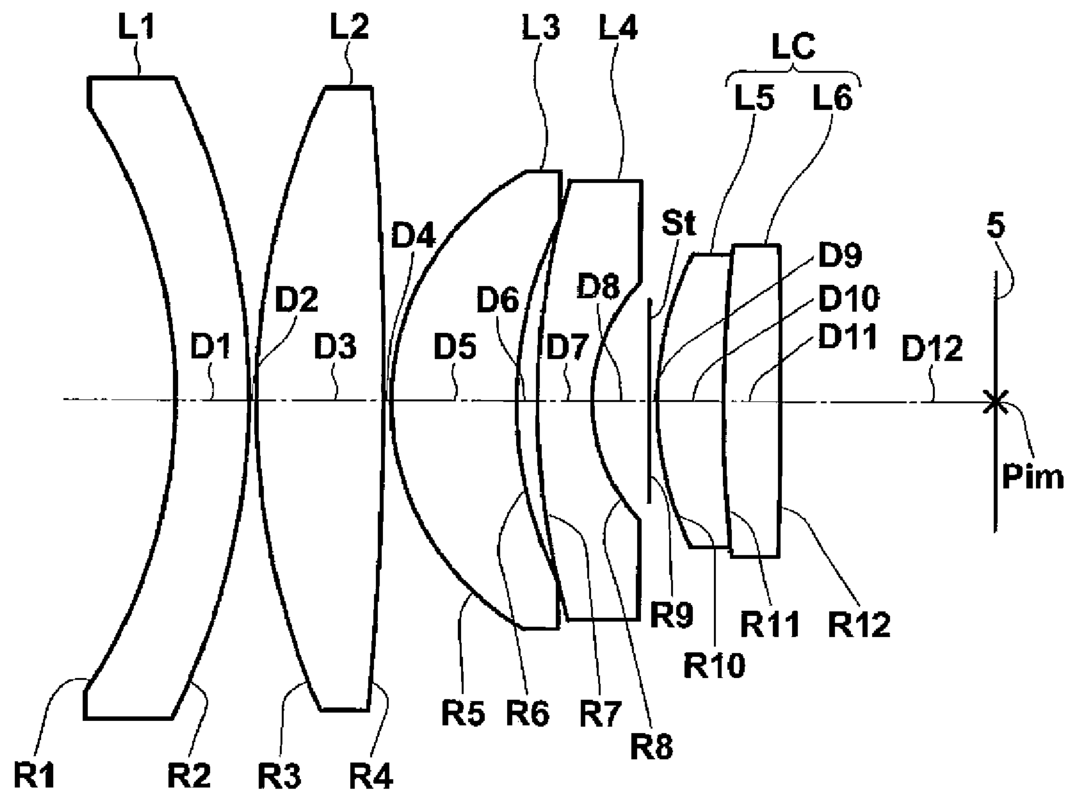
FIG. 10 is a section diagram showing the configuration of an imaging lens system according to Example 3 of the invention.
Figure 11:
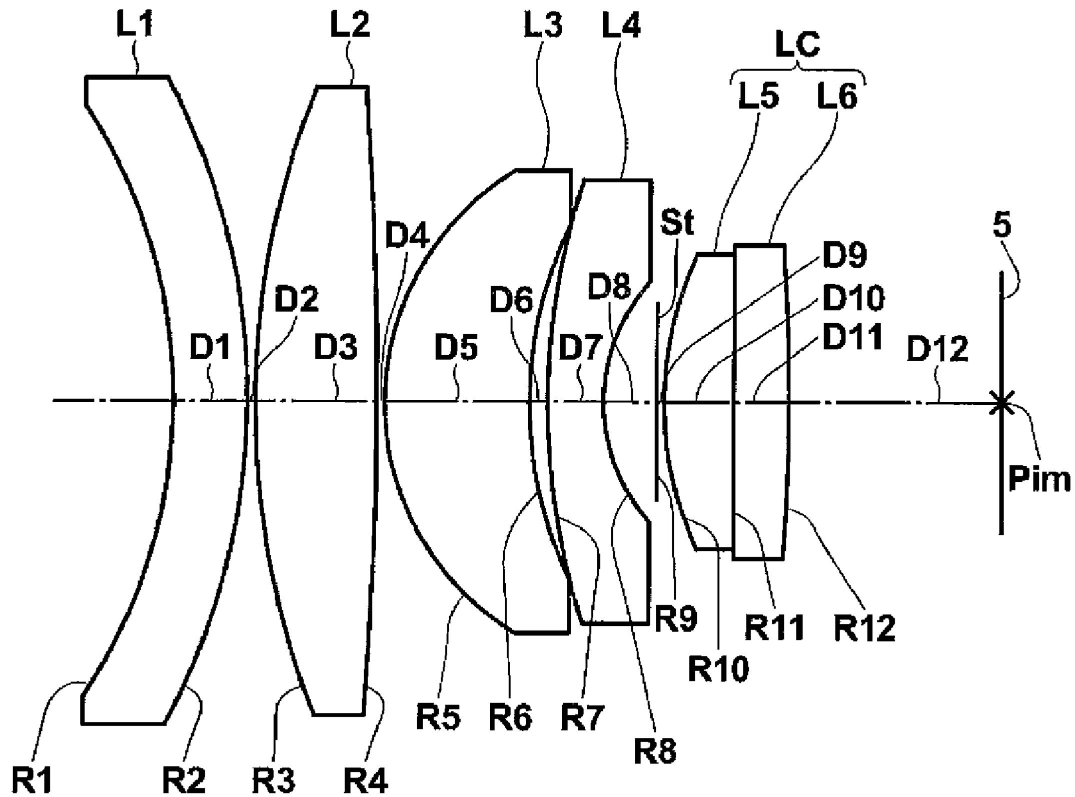
FIG. 11 is a section diagram showing the configuration of an imaging lens system according to Example 4 of the invention.
Figure 12:
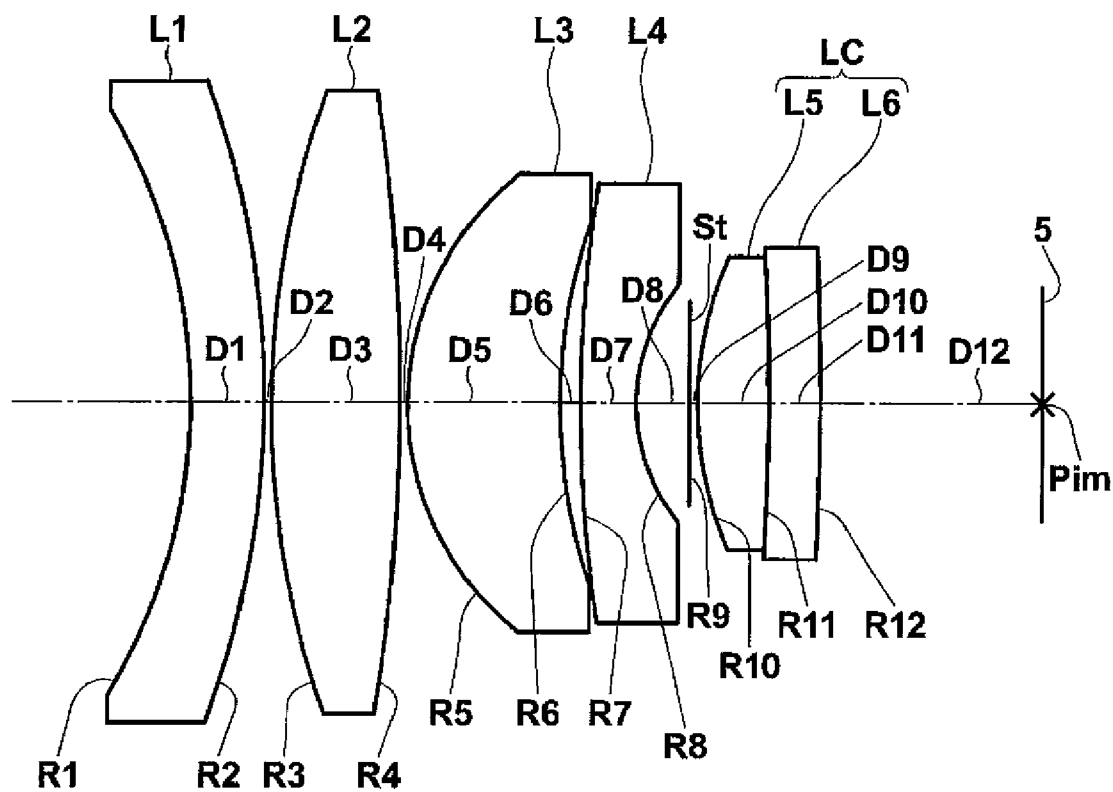
FIG. 12 is a section diagram showing the configuration of an imaging lens system according to Example 5 of the invention.
Figure 13:
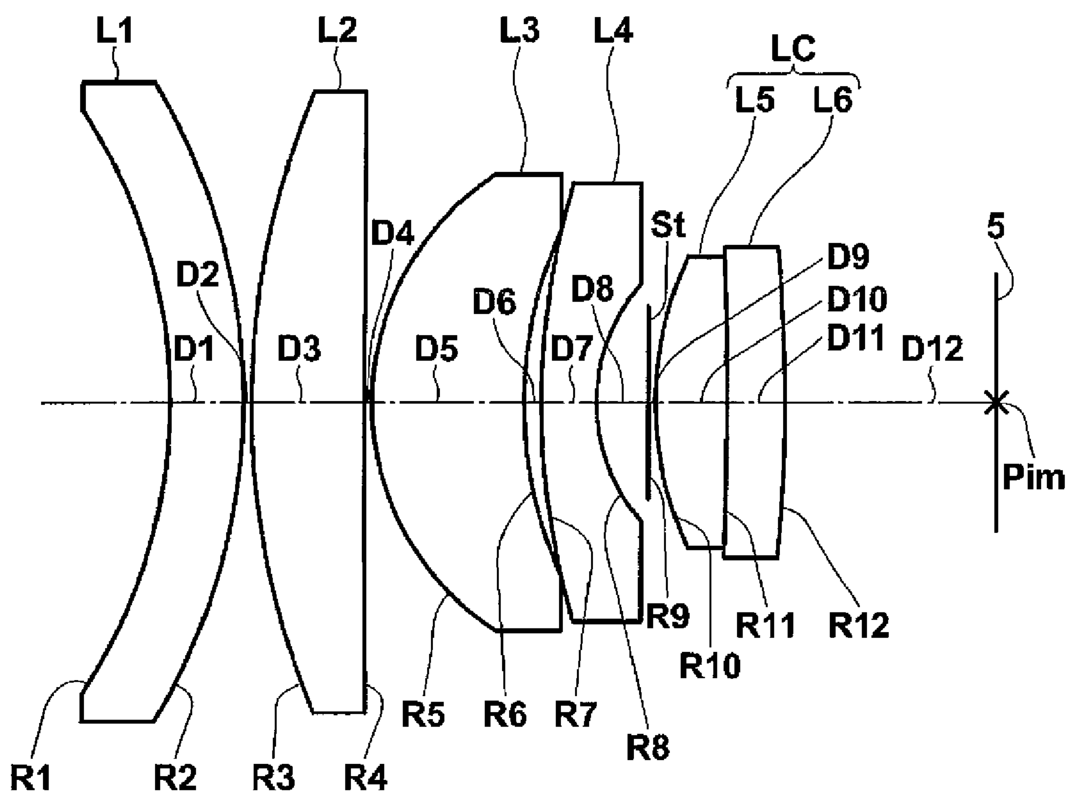
FIG. 13 is a section diagram showing the configuration of an imaging lens system according to Example 6 of the invention.
Figure 14:
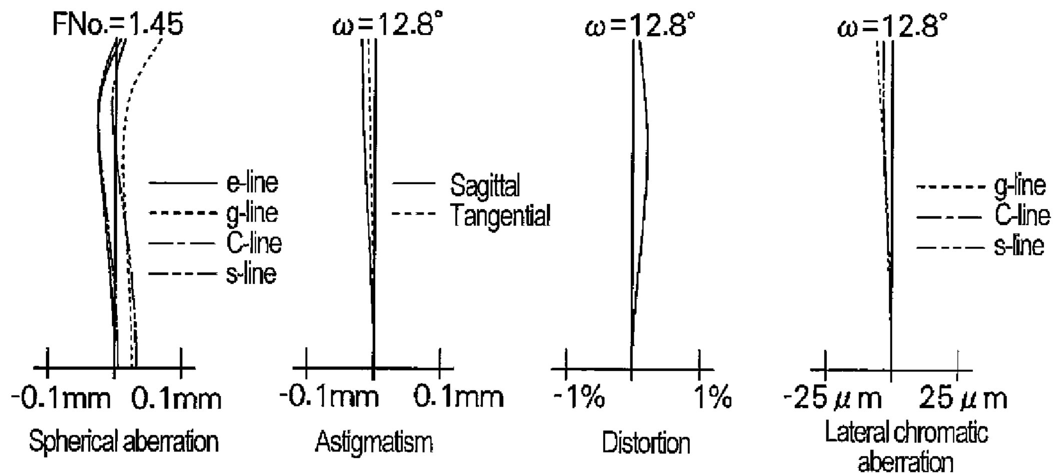
FIG. 14 is a diagram showing various aberrations of the imaging lens system according to Example 1 of the invention.
Figure 15:
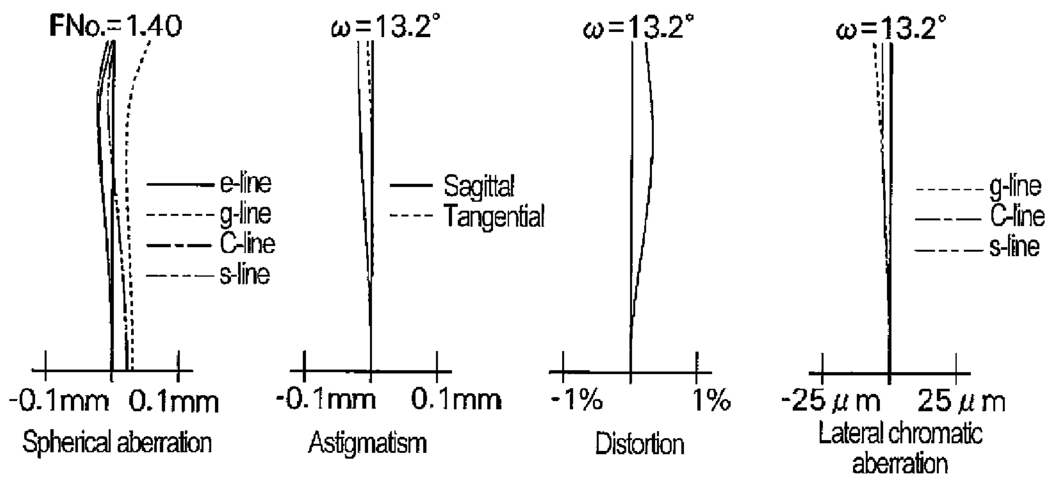
FIG. 15 is a diagram showing various aberrations of the imaging lens system according to Example 2 of the invention.
Figure 16:
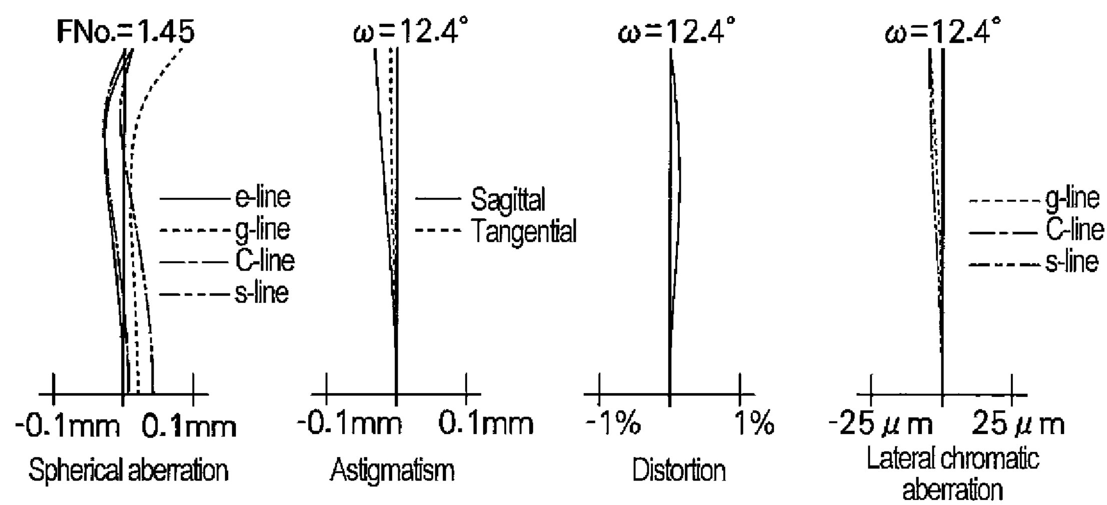
FIG. 16 is a diagram showing various aberrations of the imaging lens system according to Example 3 of the invention.
Figure 17:
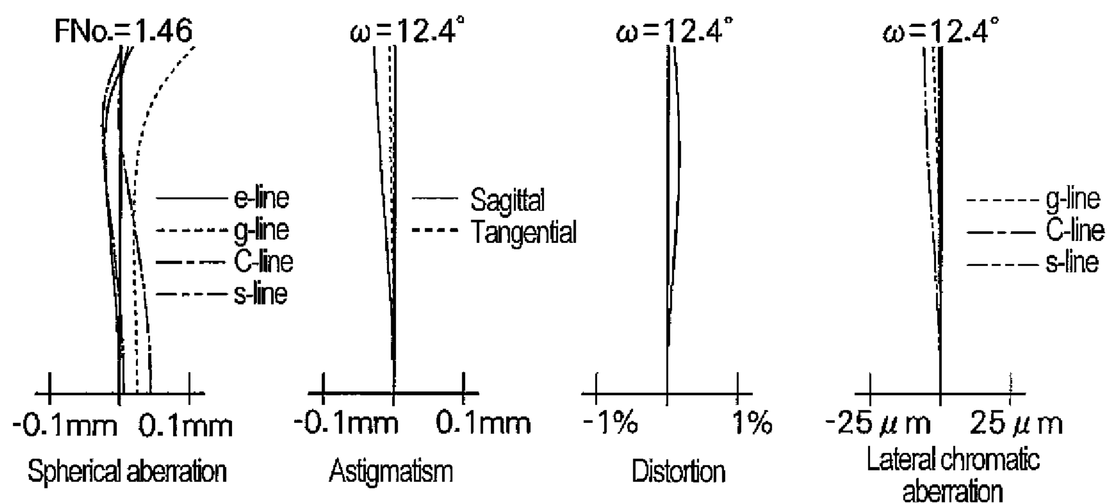
FIG. 17 is a diagram showing various aberrations of the imaging lens system according to Example 4 of the invention.
Figure 18:
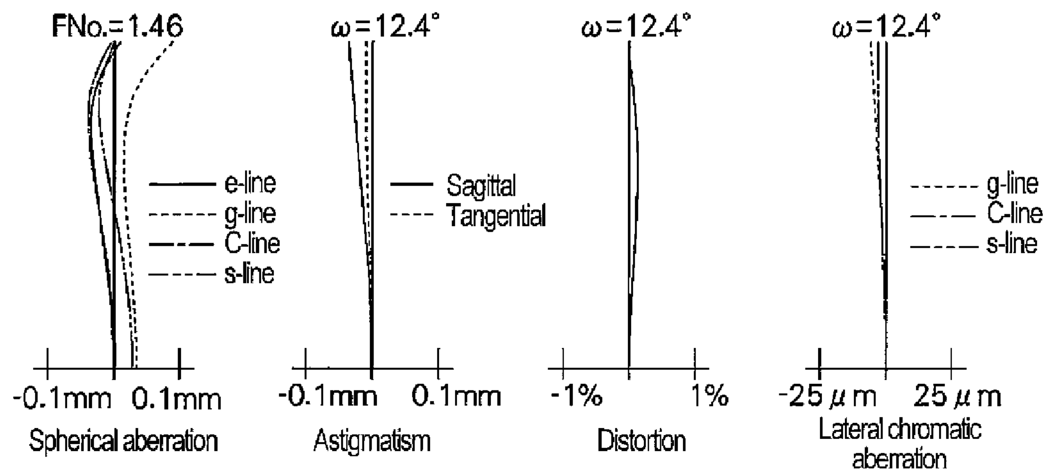
FIG. 18 is a diagram showing various aberrations of the imaging lens system according to Example 5 of the invention.
Figure 19:
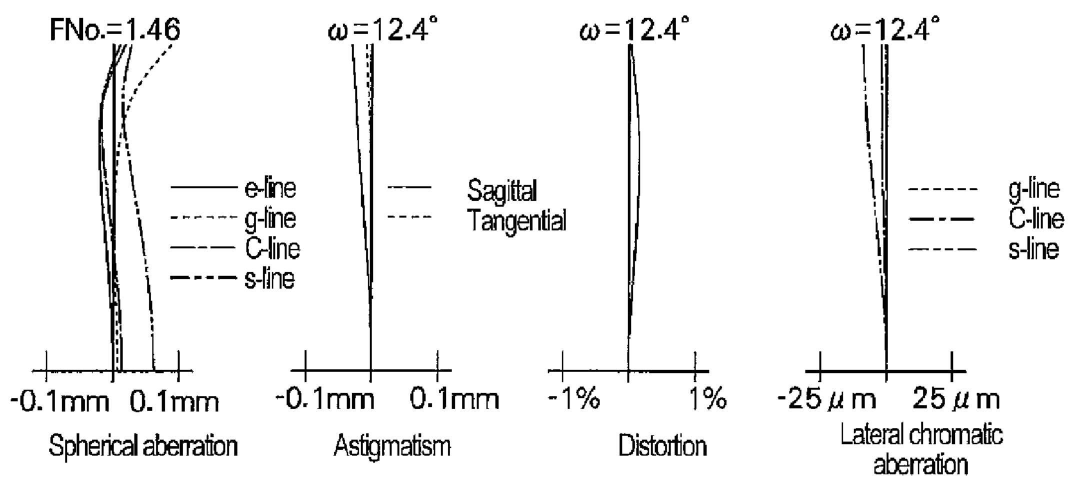
FIG. 19 is a diagram showing various aberrations of the imaging lens system according to Example 6 of the invention.

Hereinafter, numerical examples of the imaging lens system according to the embodiment of the invention will be described in detail. First, Example 1 will be described. FIG. 8 shows a lens configuration diagram of the imaging lens system according to the Example 1, and Table 1 shows lens data.

TABLE 1

Example 1 Lens Data

| Si Surface Number | Ri Radius of curvature | Di Surface separation | Ndj Refractive index | νdj Abbe number |
|---|---|---|---|---|
| 1 | −14.460 | 1.80 | 1.92286 | 18.9 |
| 2 | −20.738 | 0.20 | | |
| 3 | 16.639 | 3.50 | 1.88300 | 40.8 |
| 4 | −2236.506 | 0.20 | | |
| 5 | 7.246 | 3.30 | 1.88300 | 40.8 |
| 6 | 12.927 | 0.44 | | |
| 7 | 21.777 | 1.45 | 1.92286 | 18.9 |
| 8 | 4.343 | 1.53 | | |
| 9 (AD*) | ∞ | 0.20 | | |
| 10 | 8.188 | 1.73 | 1.78800 | 47.4 |
| 11 | 22.129 | 1.58 | 1.80518 | 25.4 |
| 12 | 283.412 | 5.24 | | |

*AD: Aperture diaphragm

In the lens data of Table 1, a surface number Si represents the sequential number of i-th (i=1, 2, 3) surface that sequentially increases as it gets closer to the image side when a surface of a component on the most object side is defined as a first surface. In Table 1, Ri represents a radius of curvature of i-th surface, and Di represents an on-axis surface separation on the optical axis Z between the i-th surface and the (i+1)th surface. In addition, Ndj represents a refractive index, at the d-line, of a j-th (j=1, 2, 3 . . . ) optical element of which the sequential number sequentially increases as it gets closer to the image side when a surface of the optical element on most the object side is defined as a first surface. In addition, νdj represents an Abbe number of the j-th optical element at the d-line. In Table 1, units of the radius of curvature and the on-axis surface separation are mm. Also, when a surface is convex toward the object side, its curvature radius is represented as positive, and when a surface is convex toward the image side, its curvature radius is represented as negative. In the lens data of Table 1, the aperture diaphragm St is also referenced by the surface number.

FIGS. 9 to 13 show lens configuration diagrams of the imaging lens systems according to Examples 2 to 6, and Tables 2 to 6 show lens data, respectively. Further, in FIGS. 8 to 13, there is also illustrated the imaging device 5 disposed on the image plane including the image formation position Pim. Also, the aperture diaphragm St shown in the drawing does not illustrate its shape and its size, but illustrates its position on the optical axis Z. In each examples, Ri and Di (i=1, 2, 3 . . . ) in each lens data table correspond to the reference signs Ri and the Di in each lens configuration diagram.

TABLE 2

Example 2 Lens Data

| Si Surface Number | Ri Radius of curvature | Di Surface separation | Ndj Refractive index | νdj Abbe number |
|---|---|---|---|---|
| 1 | −15.088 | 1.50 | 1.92286 | 18.9 |
| 2 | −20.429 | 0.46 | | |
| 3 | 15.901 | 3.50 | 1.88300 | 40.8 |
| 4 | 254.467 | 0.24 | | |
| 5 | 7.519 | 4.00 | 1.83481 | 42.7 |
| 6 | 14.423 | 0.29 | | |
| 7 | 25.342 | 1.50 | 1.92286 | 18.9 |

TABLE 2-continued

Example 2 Lens Data

| Si Surface Number | Ri Radius of curvature | Di Surface separation | Ndj Refractive index | νdj Abbe number |
|---|---|---|---|---|
| 8 | 4.216 | 1.17 | | |
| 9 (AD*) | ∞ | 0.20 | | |
| 10 | 7.286 | 1.80 | 1.77250 | 49.6 |
| 11 | 31.341 | 3.00 | 1.80518 | 25.4 |
| 12 | ∞ | 3.72 | | |

*AD: Aperture diaphragm

TABLE 3

Example 3 Lens Data

| Si Surface Number | Ri Radius of curvature | Di Surface separation | Ndi Refractive index | νdj Abbe number |
|---|---|---|---|---|
| 1 | −14.390 | 2.00 | 1.92286 | 18.9 |
| 2 | −19.547 | 0.20 | | |
| 3 | 20.955 | 3.47 | 1.83481 | 42.7 |
| 4 | −94.948 | 0.20 | | |
| 5 | 7.187 | 3.40 | 1.83481 | 42.7 |
| 6 | 11.067 | 0.57 | | |
| 7 | 21.121 | 1.50 | 1.92286 | 18.9 |
| 8 | 4.722 | 1.55 | | |
| 9 (AD*) | ∞ | 0.20 | | |
| 10 | 8.970 | 1.82 | 1.80400 | 46.6 |
| 11 | 39.943 | 1.56 | 1.80518 | 25.4 |
| 12 | −155.046 | 5.84 | | |

*AD: Aperture diaphragm

TABLE 4

Example 4 Lens Data

| Si Surface Number | Ri Radius of curvature | Di Surface separation | Ndj Refractive index | νdj Abbe number |
|---|---|---|---|---|
| 1 | −14.452 | 2.00 | 1.92286 | 18.9 |
| 2 | −18.497 | 0.20 | | |
| 3 | 23.017 | 3.29 | 1.83481 | 42.7 |
| 4 | −112.491 | 0.20 | | |
| 5 | 7.312 | 3.92 | 1.88300 | 40.8 |
| 6 | 11.034 | 0.49 | | |
| 7 | 19.478 | 1.50 | 2.14353 | 17.8 |
| 8 | 4.867 | 1.43 | | |
| 9 (AD*) | ∞ | 0.20 | | |
| 10 | 9.356 | 1.90 | 1.88300 | 40.8 |
| 11 | −775.339 | 1.48 | 1.84666 | 23.8 |
| 12 | −55.281 | 5.74 | | |

*AD: Aperture diaphragm

TABLE 5

Example 5 Lens Data

| Si Surface Number | Ri Radius of curvature | Di Surface separation | Ndj Refractive index | νdj Abbe number |
|---|---|---|---|---|
| 1 | −15.447 | 2.00 | 1.92286 | 18.9 |
| 2 | −25.086 | 0.20 | | |
| 3 | 25.534 | 3.50 | 1.88300 | 40.8 |
| 4 | −55.373 | 0.20 | | |
| 5 | 7.945 | 4.16 | 1.83400 | 37.2 |
| 6 | 15.372 | 0.56 | | |
| 7 | 39.098 | 1.50 | 1.92286 | 18.9 |

TABLE 5-continued

Example 5 Lens Data

| Si Surface Number | Ri Radius of curvature | Di Surface separation | Ndj Refractive index | νdj Abbe number |
|---|---|---|---|---|
| 8 | 5.145 | 1.45 | | |
| 9 (AD*) | ∞ | 0.20 | | |
| 10 | 9.868 | 1.96 | 1.88300 | 40.8 |
| 11 | −70.224 | 1.39 | 1.84666 | 23.8 |
| 12 | −88.493 | 6.04 | | |

*AD: Aperture diaphragm

TABLE 6

Example 6 Lens Data

| Si Surface Number | Ri Radius of curvature | Di Surface separation | Ndj Refractive index | νdj Abbe number |
|---|---|---|---|---|
| 1 | −14.477 | 2.00 | 2.14353 | 17.8 |
| 2 | −16.939 | 0.20 | | |
| 3 | 22.052 | 3.07 | 1.83481 | 42.7 |
| 4 | 1226.134 | 0.20 | | |
| 5 | 7.458 | 4.15 | 1.88300 | 40.8 |
| 6 | 11.657 | 0.47 | | |
| 7 | 21.001 | 1.50 | 2.14353 | 17.8 |
| 8 | 4.939 | 1.41 | | |
| 9 (AD*) | ∞ | 0.20 | | |
| 10 | 9.483 | 1.93 | 1.88300 | 40.8 |
| 11 | −108.297 | 1.59 | 1.92286 | 18.9 |
| 12 | −44.037 | 5.74 | | |

*AD: Aperture diaphragm

In the imaging lens system according to the Examples 1 to 6, a material having a refractive index of 1.75 or more at the d-line is used for all the lenses constituting the whole system. In order to achieve downsizing, it is preferable that each lens has a large power. However, when a small radius of curvature is set for each surface to have a large power, it becomes difficult to correct all aberrations including chromatic aberration. In order to increase a power without decreasing a radius of curvature of each surface, the material having a high refractive index as described above may be employed. Thereby, it is possible to achieve downsizing while suppressing all aberrations. Likewise, it is more preferable that refractive indexes of all the lenses at the d-line are larger than 1.8.

Table 7 shows various data in the imaging lens system according to Examples 1 to 6. In Table 7, the row of “focal length” shows a focal length of the whole system, the row of “f5” shows a focal length of the fifth lens L5, and the row of “f6” shows a focal length of the sixth lens L6. In addition, the row of “(R2−R1)/(R2+R1)” shows values corresponding to the conditional expression (1), the row of “νd1−νd2” shows values corresponding to the conditional expression (2), and the row of “Ndmin” shows minimum values of a refractive index at the d-line in the lenses of the whole system. Furthermore, the row of αi shows incident angles of the axial marginal ray 2 with respect to the surface on the most object side of the cemented lens LC, and the row of “αe” shows exit angles of the axial marginal ray 2 with respect to the surface on the most image side of the cemented lens LC. Also, the row of “αmin” shows minimum values of incident angles of the axial marginal rays 2 from air to the surfaces and the exit angles of the axial marginal rays 2 from the surfaces to air, in air-exposed surfaces of all the lenses of the whole system. In Table 7, units of the focal length f5 and the back focal length f6 are mm, and units of the total angle of view, αi, αe, and αmin are degree. As can be seen from Table 7, all Examples 1 to 6 satisfy the conditional expressions (1) and (2).

Furthermore, as can be seen from Table 7, Examples 1 to 4 and 6 are configured to have αi of 8° or more, αe of 8° or more, and αmin of 60 or more, and to be able to suppress a ghost image having a strong intensity.

TABLE 7

| | Example 1 | Example 2 | Example 3 | Example 4 | Example 5 | Example 6 |
|---|---|---|---|---|---|---|
| Focal length | 14.03 | 13.60 | 14.50 | 14.50 | 14.50 | 14.50 |
| F number | 1.45 | 1.40 | 1.45 | 1.46 | 1.46 | 1.46 |
| Total angle of view | 25.68 | 26.43 | 24.89 | 24.88 | 24.90 | 24.88 |
| Back focal length | 5.24 | 3.72 | 5.84 | 5.74 | 6.04 | 5.74 |
| f5 | 15.64 | 11.90 | 14.02 | 10.48 | 9.91 | 9.95 |
| f6 | 29.73 | 38.92 | 39.59 | 70.24 | −416.25 | 79.47 |
| (R2 − R1)/(R2 + R1) | 0.178 | 0.150 | 0.152 | 0.123 | 0.238 | 0.078 |
| νd1 − νd2 | 22.0 | 24.2 | 21.2 | 17.0 | 17.0 | 21.9 |
| Ndmin | 1.78800 | 1.77250 | 1.80400 | 1.83481 | 1.83400 | 1.83481 |
| αi | 11.78 | 12.03 | 12.52 | 12.88 | — | 13.09 |
| αe | 19.73 | 20.30 | 20.91 | 22.30 | — | 22.87 |
| αmin | 9.43 | 10.06 | 11.35 | 12.88 | — | 9.60 |

FIGS. 14 to 19 are aberration diagrams showing spherical aberration, astigmatism, distortion, and lateral chromatic aberration of the imaging lens systems according to Examples 1 to 6, respectively. In the aberration diagrams, there are shown aberrations in which the e-line (a wavelength of 546.07 nm) is set as a reference wavelength. However, in the spherical aberration diagrams and the lateral chromatic aberration diagrams, there are also shown aberrations at the g-line (a wavelength of 43 5.83 nm), the C-line (a wavelength of 656.3 nm), and the s-line (a wavelength of 852. nm). Also, the aberration diagram of distortion shows a deviation amount from an ideal image height expressed by $f \times \tan\theta$, where f denotes the focal length of the whole system and θ (handled as a variable; $0 \leqq \theta \leqq \omega$) denotes the half angle of view. The F No. in the spherical aberration diagram is an F number, and the ω in the other aberration diagrams is a half angle of view.

In Examples 1 to 6, it can be seen from the above data that F number is a small value in the range of 1.40 to 1.46, and various aberrations are satisfactorily corrected in the wide wavelength range from the visible band to the infrared band. Furthermore, in Examples 1 to 6, the optical system is configured to have a long back focal length for easily inserting a filter and the like and to have a small size. Moreover, in Examples 1 to 6, no aspheric lens is used at all, and all the lenses in the optical system are spherical lenses. Thus, it is possible to manufacture the system at low cost. The imaging lens systems according to Examples 1 to 6 are applicable to on-board cameras and the like to take images of the front, the side, and the rear of a vehicle.

Figure 20:
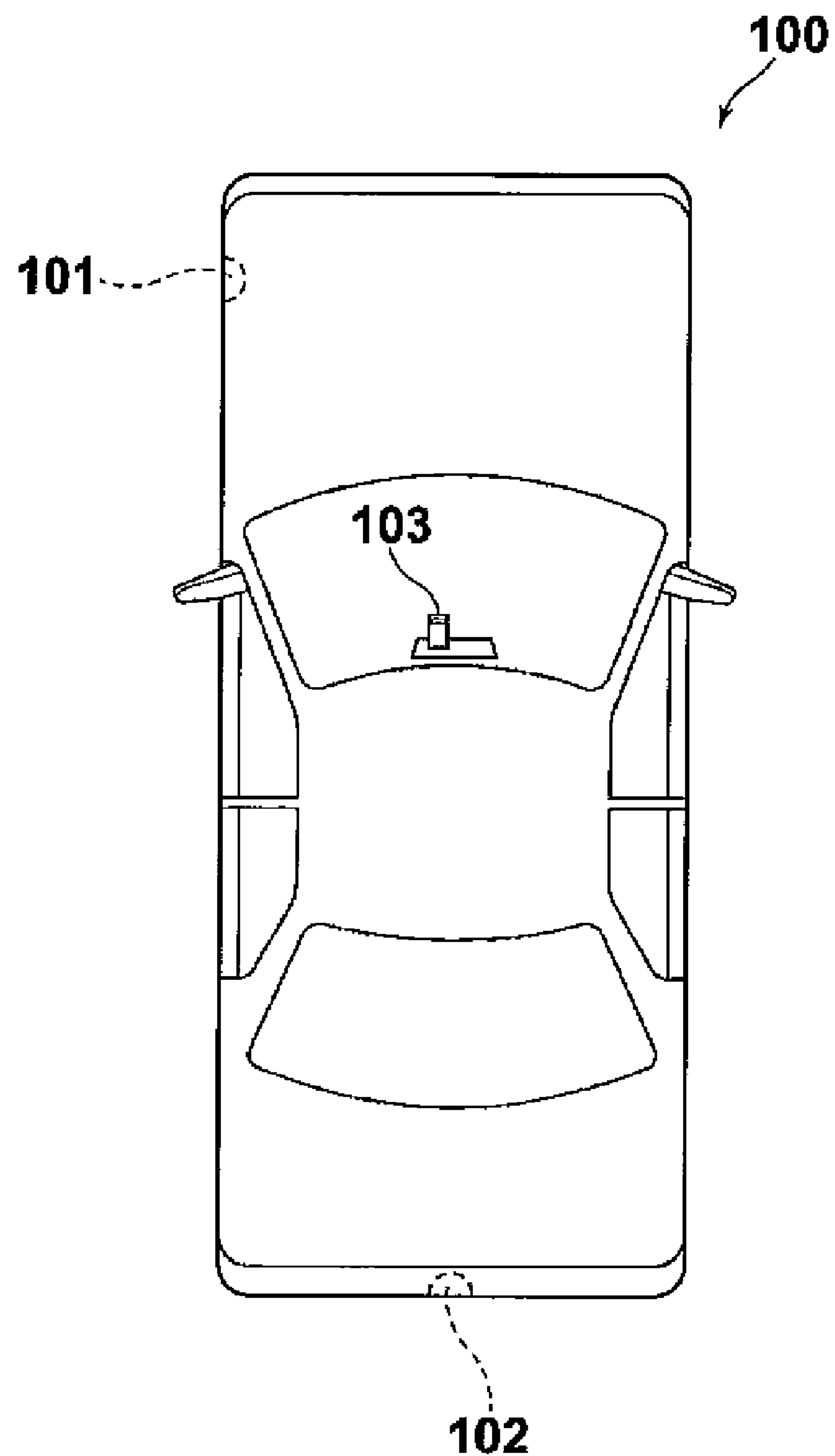
FIG. 20 is a diagram for explaining arrangement of an on-vehicle imaging apparatus according to the embodiment of the invention.

FIG. 20 shows a feature of the vehicle 100 equipped with the imaging apparatus and the imaging apparatus according to the embodiment. In FIG. 20, the vehicle 100 includes an outside-vehicle camera 101 for photographing a blind spot area on the passenger seat side, an outside-vehicle camera 102 for photographing a blind spot area on the rear side of the vehicle 100, and an in-vehicle camera 103 disposed on the rear of a room mirror and for photographing the same visual field range as a driver. The outside-vehicle camera 101, the outside-vehicle camera 102, and the in-vehicle camera 103 are the imaging apparatuses, and include the imaging lens system 1 according to the embodiment of the invention and the imaging device 5 converting an optical image formed by the imaging lens system 1 into an electric signal.

As described above, the imaging lens system 1 according to the embodiment of the invention is configured to have a small size and a small F number while maintaining favorable optical performance in a wide wavelength range from the visible region and the near-infrared region, and is able to be manufactured at low cost. Thus, it is possible to downsize the outside-vehicle cameras 101 and 102 and the in-vehicle camera 103 at low cost, and it is also possible to form a bright fine image on the imaging surface of the imaging device 5 in the wide wavelength range from the visible region and the near-infrared region.

Furthermore, the imaging lens system 1 according to the embodiment of the invention is configured to have favorable optical performance and suppress occurrence of a ghost image having a strong intensity. Thus, the outside-vehicle cameras 101 and 102 and the in-vehicle camera 103 are able to obtain a fine image, and hardly form a ghost image having a strong intensity.

The invention has been described with reference to the embodiment and the examples, but the invention is not limited thereto. The invention may be modified in various ways. For example, the values of a radius of curvature, an on-axis surface separation, and a refractive index of the lens components are not limited to the values shown in the numerical examples, and can have other values.

Also, in the embodiment of the imaging apparatus, the example in which the invention is applied to the on-board camera has been described with reference to the drawing, but the invention is not limited thereto. The invention is also applicable to other imaging apparatuses such as a surveillance camera.

What is claimed is:

1. An imaging lens system comprising:

a negative first lens that is disposed on a most object side, has a concave surface directed toward the object side and has a meniscus shape;

a cemented lens that is disposed on a most image side, a most object side surface of the cemented lens being a convex surface; and a stop that is disposed just in front of the object side of the cemented lens, wherein the following conditional expressions are satisfied:

$$0.05<(R2-R1)/(R1+R2)<0.25 \quad (1)$$

$$\nu d1-\nu d2>15 \quad (2)$$

where R1 denotes a radius of curvature of an object side surface of the first lens, R2 denotes a radius of curvature of an image side surface of the first lens, vd1 denotes an Abbe number of a lens, which is located on the most object side among lenses constituting the cemented lens, at the d-line, and vd2 denotes an Abbe number of a lens, which is located on the most image side among the lenses constituting the cemented lens, at the d-line.

2. The imaging lens system according to claim 1, wherein all the lenses constituting the cemented lens are positive lenses.

3. The imaging lens system according to claim 1, wherein the following conditional expressions are satisfied:

$$0.10<(R2-R1)/(R1+R2)<0.20 \quad (1\text{-}1)$$

where R1 denotes a radius of curvature of the object side surface of the first lens, and R2 denotes a radius of curvature of the image side surface of the first lens.

4. The imaging lens system according to claim 1, wherein an absolute value of a radius of curvature of each surface of the cemented lens is larger as approaching the image side from the object side.

5. The imaging lens system according to claim 1, wherein refractive indexes of all the tenses at the d-line are larger than 1.75.

6. The imaging lens system according to claim 1, wherein the following conditional expression is satisfied:

$$vd1-vd2>20 \quad (2\text{-}1),$$

where vd1 denotes an Abbe number of a lens, which is located on the most object side among lenses constituting the cemented lens, at the d-line, and vd2 denotes an Abbe number of a lens, which is located on the most image side among the lenses constituting the cemented lens, at the d-line.

7. An imaging apparatus comprising:

the imaging lens system according to claim 1; and an imaging device that converts an optical image formed by the imaging lens system into an electric signal.

8. An imaging lens system comprising, in order from an object side:

a negative first lens that has a concave shape directed toward the object side and has a meniscus shape;

a positive second lens that has a convex surface directed toward the object side;

a positive third lens that has a meniscus shape with a convex shape directed toward the object side;

a negative fourth lens that has a meniscus shape with a convex surface directed toward the object side;

a stop; and a cemented lens including a positive fifth lens and a positive sixth lens, the cemented lens having a convex surface directed toward the object side.

9. The imaging lens system according to claim 8, wherein the following conditional expressions are satisfied:

$$0.10<(R2-R1)/(R1+R2)<0.20 \quad (1\text{-}1)$$

where R1 denotes a radius of curvature of the object side surface of the first lens, and R2 denotes a radius of curvature of the image side surface of the first lens.

10. The imaging lens system according to claim 8, wherein an absolute value of a radius of curvature of each surface of the cemented lens is larger as approaching the image side from the object side.

11. The imaging lens system according to claim 8, wherein refractive indexes of all the lenses at the d-line are larger than 1.75.

12. The imaging lens system according to claim 8, wherein the following conditional expression is satisfied:

$$vd1-vd2>20 \quad (2\text{-}1),$$

where vd1 denotes an Abbe number of a lens, which is located on the most object side among lenses constituting the cemented lens, at the d-line, and vd2 denotes an Abbe number of a lens, which is located on the most image side among the lenses constituting the cemented lens, at the d-line.

13. An imaging apparatus comprising:

the imaging lens system according to claim 8; and an imaging device that converts an optical image formed by the imaging lens system into an electric signal.

14. An imaging lens system comprising:

a negative meniscus lens that is disposed on a most object side and has a concave surface directed toward the object side;

a cemented lens that is disposed on a most image side, a most object side surface of the cemented lens being a convex surface, the cemented lens being formed by cementing positive lenses; and a stop that is disposed just in front of the object side of the cemented lens, wherein an incident angle of an axial marginal ray to the most object side surface of the cemented lens is 8° or more, and an exit angle of the axial marginal ray from the most image side surface of the cemented lens is 8° or more.

15. The imaging lens system according to claim 14, wherein in air-exposed surfaces of all the lenses of the whole system, respective incident angles of the axial marginal rays from air to the surfaces are 6° or more, and exit angles of the axial marginal rays from the surfaces to air is 6° or more.

16. The imaging lens system according to claim 14, wherein refractive indexes of all the lenses at the d-line are larger than 1.8.

* * * * *